(12) United States Patent
Zhang et al.

(10) Patent No.: US 9,351,260 B2
(45) Date of Patent: May 24, 2016

(54) TRANSMIT POWER CONTROL

(75) Inventors: Zhang Zhang, Beijing (CN); Xinyu Gu, Beijing (CN); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/407,934

(22) PCT Filed: Jun. 14, 2012

(86) PCT No.: PCT/CN2012/076903
§ 371 (c)(1),
(2), (4) Date: Dec. 12, 2014

(87) PCT Pub. No.: WO2013/185323
PCT Pub. Date: Dec. 19, 2013

(65) Prior Publication Data
US 2015/0173027 A1    Jun. 18, 2015

(51) Int. Cl.
*H04W 52/24* (2009.01)
*H04W 52/12* (2009.01)
*H04W 88/08* (2009.01)
*H04W 88/12* (2009.01)

(52) U.S. Cl.
CPC .......... *H04W 52/241* (2013.01); *H04W 52/243* (2013.01); *H04W 52/12* (2013.01); *H04W 52/247* (2013.01); *H04W 88/08* (2013.01); *H04W 88/12* (2013.01)

(58) Field of Classification Search
CPC ........................... H04W 52/243; H04W 52/241
USPC ............. 455/522, 69, 452.2, 67.13, 63.1, 501
See application file for complete search history.

(56) References Cited

U.S. PATENT DOCUMENTS

| | | | |
|---|---|---|---|
| 6,609,008 B1 * | 8/2003 | Whang | H04W 52/20 370/318 |
| 2003/0224836 A1 * | 12/2003 | Tsai | H04L 1/0001 455/573 |
| 2007/0197251 A1 | 8/2007 | Das et al. | |
| 2010/0150000 A1 * | 6/2010 | Sakata | H04L 5/0007 370/252 |

FOREIGN PATENT DOCUMENTS

| | | |
|---|---|---|
| CN | 101500258 A | 8/2009 |
| EP | 0776105 A1 | 5/1997 |
| JP | 2004088696 A | 3/2004 |

OTHER PUBLICATIONS

PCT International Search Report for PCT Application No. PCT/CN2012/076903 dated Mar. 28, 2013; 4pgs.
PCT Written Opinion of the International Searching Authority for PCT Application No. PCT/CN2012/076903 dated Mar. 28, 2013; 5pgs.
PCT Notification of Transmittal of the International Preliminary Report on Patentability Chapter II, for PCT Application No. PCT/CN2012/076903 dated Sep. 19, 2014; 8pgs.

(Continued)

*Primary Examiner* — John J Lee
(74) *Attorney, Agent, or Firm* — NDWE LLP (57) ABSTRACT

A method for transmit power control (TPC) is provided. The method includes obtaining a first channel quality of a pilot channel for a user equipment (UE); performing an interference cancellation on the pilot channel to obtain a second channel quality of the channel; and instructing the UE to adjust the transmit power based on at least the first channel quality.

35 Claims, 6 Drawing Sheets

(56) References Cited

OTHER PUBLICATIONS

Partial Supplementary European Search Report, EP Application No. 12879040.9, dated Oct. 23, 2015, 5 pages.

Extended European Search Report, EP Application No. 12879040.9, dated Feb. 8, 2016, 11 pages.

* cited by examiner

TRANSMIT POWER CONTROL

CROSS-REFERENCE TO RELATED APPLICATIONS

This application is a National stage of International Application No. PCT/CN2012/076903, filed Jun. 14, 2012, which is hereby incorporated by reference.

TECHNICAL FIELD

The disclosure generally relates to wireless communications, and more particularly, to a transmit power control method and related components therefor such as a base station or a radio network controller.

BACKGROUND

Unless otherwise indicated herein, the approaches described in this section are not prior art to the claims in this disclosure and are not admitted to be prior art by inclusion in this section.

Typically, there are two power control loops, i.e., the inner loop and the outer loop. The inner loop power control is used to continuously adjust transmission power such that the perceived quality is sufficient and adequate but not excessively good. It may be employed in both uplink and downlink. Specifically, in the uplink, it is the dedicated physical control channel (DPCCH) power that is actually controlled by the inner loop power control based on the comparison of the perceived uplink DPCCH quality with the uplink DPCCH quality target, while the power offset between the data channel(s) and DPCCH is not changed by the power control. For example, the DPCCH quality here may refer to DPCCH Signal to Interference plus Noise Ratio (SINR). A lower DPCCH power might somewhat impact the channel estimation, but usually the penalty is very limited.

The outer loop power control adjusts the DPCCH quality target used for the inner loop power control. Such an adjustment is based on the perceived error rate of the data part. This implies that the overall power control including both the inner loop power control and the outer loop power control adjusts the quality for both pilot (DPCCH) and data jointly just based on the data quality.

When an advanced receiver such as an interference cancellation (IC) receiver is used at the base station the perceived interference after the cancellation can substantially be decreased by "soft" symbols regeneration and cancellation, and the received SINR at the BS after IC can be significantly improved. This results in that an evident improvement in uplink data rate can be achieved. Both data channel (e.g. E-DPDCH) and control channel (e.g. DPCCH) can benefit from IC. However, it should be noted that the first initial channel estimate based on only DPCCH must be good enough to start the whole IC process, and that the channel estimate is before any IC. This is because with a poor channel estimation the regenerated signal that is cancelled will deviate from the true received signal. Thus, the DPCCH quality must be good enough and a bad DPCCH quality can negatively impact the benefit we can get from IC.

Figure 1:
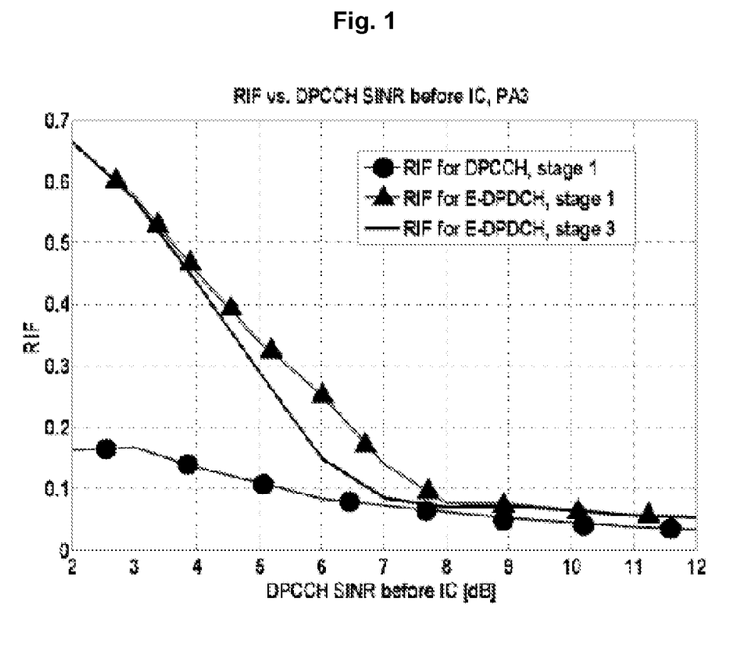
FIG. 1 illustrates the level of interference that can be cancelled from DPCCH and E-DPDCH with multi-stage IC.

FIG. 1 illustrates the level of interference that can be cancelled from DPCCH and E-DPDCH with multi-stage IC. Lower residual interference fraction (RIF) value means less interference remains after IC. It can be seen from FIG. 1 that if DPCCH SINR before IC is not high enough (e.g., <7 dB), the residual (remaining) interference after IC due to E-DPDCH will quickly increase and there will be less benefit of using IC. Therefore, ensuring better DPCCH quality before IC is of particular importance.

For example, with turbo-IC, there is a new dependence between the users. That is, the reduced received power of one user may lead to higher residual interference and worse performance of the other user(s). A well known example of an advanced receiver is a Minimum Mean Square Error Interference Rejection Combining (MMSE-IRC). An example of a more sophisticated advanced receiver is Mean Square Error-turbo Interference Cancellation (MMSE-turbo IC) capable of performing nonlinear subtractive-type interference cancellation, which may be used to further enhance system performance.

It should be noted that the terms "interference mitigation receiver", "interference cancellation receiver", "interference rejection receiver", "interference aware receiver", "interference avoidance receiver", etc. may be interchangeably used here since they all belong to a category of an advanced receiver or an enhanced receiver. All these different types of advanced receiver may improve respective performances by fully or partly eliminating the interference arising from at least one interfering source. The embodiments of the present invention are applicable for any type of advanced receiver used in the base station.

Since the power control loops only consider the performance of a single user, there is a risk that the decreasing of DPCCH quality target (by the outer loop power control) and/or of the UE transmit power (by the inner loop power control) can have a negative effect on other users. This is undesirable especially in terms of the cost, complexity and processing (impacting power consumption, delay, etc.) associated with implementing IC. In this case, it may be better to keep or increase the pilot (DPCCH) power but decrease the data power instead. However, in WCDMA/HSPA, it is impossible to control pilot and data power independently with the power control.

For the above mentioned problems about the current transmit power control, it is needed to design a method to overcome them so as to control the transmit power more effectively.

SUMMARY

According to the present disclosure, an improved method for performing a transmit power control is proposed to solve or relieve at least one of the above problems or disadvantages.

In a first aspect of the present disclosure, there is provided a transmit power control (TPC) method, including: obtaining a first channel quality of a pilot channel for an user equipment (UE); performing an interference cancellation on the pilot channel to obtain a second channel quality of the channel; and instructing the UE to adjust the transmit power based on at least the first channel quality.

In one example, instructing the UE to adjust the transmit power based on at least the first channel quality may include: if the first channel quality is not smaller than a first threshold value and the second channel quality is smaller than a second threshold value, sending to the UE a first TPC command instructing the UE to increase its transmit power.

In another example, instructing the UE to adjust the transmit power based on at least the first channel quality may include: if the first channel quality is not smaller than the first threshold value and the second channel quality is not smaller than a second threshold value, sending to the UE a second TPC command instructing the UE to decrease its transmit power.

In still another example, instructing the UE to adjust the transmit power based on at least the first channel quality may include: if the first channel quality is smaller than the first threshold value, sending a third TPC command instructing the UE to increase its transmit power.

In yet another example, the second threshold value may be notified from an RNC. Furthermore, the second threshold value may be adjusted by the RNC when the first channel quality is larger than the first threshold value plus a predetermined offset value. For example, the second threshold value may be kept unchanged when the first channel quality is smaller than the first threshold value minus the predetermined offset value. In this case, the method may further include notifying the RNC of the first channel quality or an indicator of whether the first channel quality is below the first threshold value or not.

In an example, the first threshold value may depend on efficiency of the interference cancellation.

In another example, the first threshold value may be configured by an RNC.

In still another example, the pilot channel may be a Dedicated Physical Control Channel (DPCCH) channel.

In a second aspect of the present disclosure, there is provided a base station, including: an obtaining unit configured to obtain a first channel quality of a pilot channel for an user equipment (UE); an interference cancellation unit configured to perform an interference cancellation on the pilot channel to obtain a second channel quality; and a transmit power adjusting unit configured to instruct the UE to adjust the transmit power based on at least the first channel quality.

In an example, the transmit power adjusting unit may be further configured to send to the UE a first TPC command instructing the UE to increase its transmit power, if the first channel quality is not smaller than a first threshold value and the second channel quality is smaller than a second threshold value.

In another example, the transmit power adjusting unit may be further configured to send to the UE a second TPC command instructing the UE to decrease its transmit power, if the first channel quality is not smaller than the first threshold value and the second channel quality is not smaller than a second threshold value.

In still another example, the transmit power adjusting unit may be further configured to send a third TPC command instructing the UE to increase its transmit power, if the first channel quality is smaller than the first threshold value.

In yet another example, the second threshold value may be notified from an RNC. Furthermore, the second threshold value may be adjusted by the RNC when the first channel quality is larger than the first threshold value plus a predetermined offset value. For example, the second threshold value may be kept unchanged when the first channel quality is smaller than the first threshold value minus the predetermined offset value. In this case, the base station may further include a notifying unit configured to notify the RNC of the first channel quality or an indicator of whether the first channel quality is below the first threshold value or not.

In an example, the first threshold value may depend on efficiency of the interference cancellation.

In another example, the first threshold value may be configured by an RNC.

In still another example, the pilot channel may be a Dedicated Physical Control Channel (DPCCH) channel.

In a third aspect of the present disclosure, there is provided a radio network controller (RNC), including: an obtaining unit configured to obtain a comparison result between a first channel quality of a pilot channel on which an interference cancellation is to be performed, and a first threshold value and a second threshold value; an adjusting unit configured to adjust a channel quality target of the pilot channel based on the comparison result; and a transmitting unit configured to transmit the adjusted channel quality target.

In an example, the adjusting unit may be further configured to increase the channel quality target when the first channel quality is smaller than the first threshold value.

In another example, the adjusting unit may be further configured to adjust the channel quality target based on a conventional outer loop power control when the first channel quality is larger than the second threshold value.

In still another example, the adjusting unit may be further configured to keep the channel quality target unchanged when the first channel quality is between the first threshold value and the second threshold value.

In a fourth aspect of the present disclosure, there is provided a computer storage medium having computer-executable instructions stored thereon which, when executed by a computer, adapt the computer to perform the method according to any one of the first and second aspects of the present disclosure.

The embodiments of the present disclosure at least lead to the following benefits and advantages:

Avoiding interference increase after IC due to power control;
More efficient exploration of IC benefit;
Improved throughput;
Easy to implement; and
Providing more flexibility.

BRIEF DESCRIPTION OF THE DRAWINGS

The above and other objects, features and advantages of the present disclosure will be clearer from the following detailed description about the non-limited embodiments of the present disclosure taken in conjunction with the accompanied drawings, in which.

DETAILED DESCRIPTION OF EMBODIMENTS

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

Figure 2:
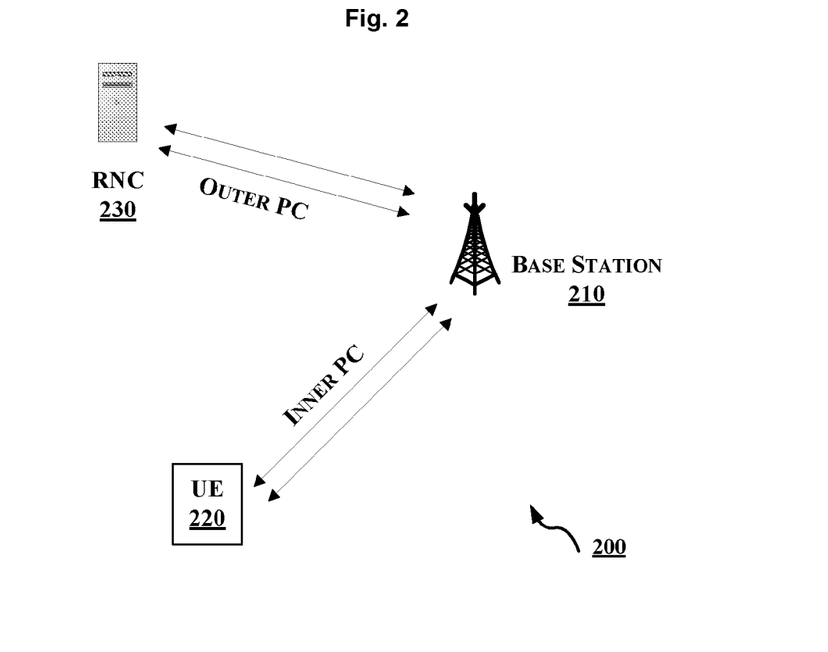
FIG. 2 shows a block diagram conceptually illustrating an example of a telecommunications system 200 where the present disclosure may be applied.

FIG. 2 is a block diagram conceptually illustrating an example of a telecommunications system 200 where the present disclosure may be applied. As shown in FIG. 2, the system 200 may include a base station 210, a user equipment (UE) 220 and a RNC 230. Although FIG. 2 is exemplified in the context of one UE, two or more UEs may be also applied here.

The base station 210 may be adapted to perform the inner loop power control, i.e., to adjust transmit power of the UE 220 by means of the inner loop power control. The RNC 230 may be adapted to perform the outer loop power control, i.e., to adjust the channel quality target used for the inner loop power control by means of the outer loop power control. The inner loop power control/the outer loop power control may be achieved by exchanging necessary parameters between the base station 210 and the UE 220/the RNC 230.

Furthermore, the base station 210 may include various advanced receivers that are capable of IC, such as MMSE-IRC, MMSE-turbo IC, etc.

Figure 3:
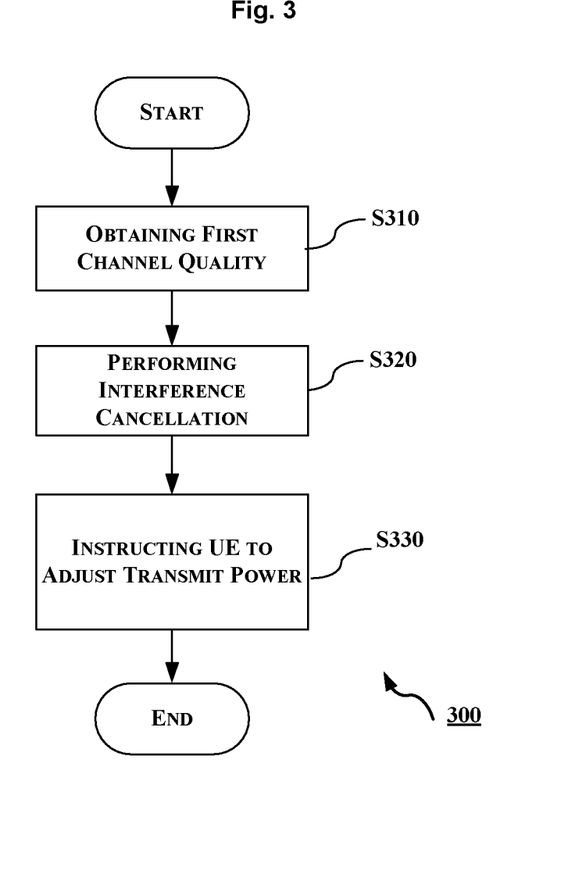
FIG. 3 shows a flowchart of a method 300 for performing a transmit power control (TPC) according to an embodiment of the present disclosure.

With FIG. 2 in mind, a method 300 for performing a transmit power control (TPC) according to a first embodiment of the present disclosure is illustrated in FIG. 3.

As shown in FIG. 3, the base station 210 may obtain a first channel quality of a pilot channel for the UE 220 in step S310.

The first threshold value here may be a settable parameter, which, for example, may be configured by the RNC 230 such as by depending on efficiency of the interference cancellation. In this case, the signaling may be done over Iub interface using NBAP signaling, i.e., between the base station 210 and the RNC 230. Alternatively, the first threshold value may also be configured in the base station 210 by another network node, e.g., SON, OSS, O&M, etc. In this case the signaling may be done over an interface between the base station 210 and the relevant network node.

In step S320, the base station 210 may perform an interference cancellation on the pilot channel to obtain a second channel quality of the channel. As an example, the pilot channel may be DPCCH channel. In this case, each of the first channel quality and the second channel quality may refer to a DPCCH quality.

Then, the base station 210 may instruct the UE 220 to adjust the transmit power based on at least the first channel quality (step S330). For example, step S330 may be achieved by using the detailed steps as illustrated in FIG. 4.

Figure 4:
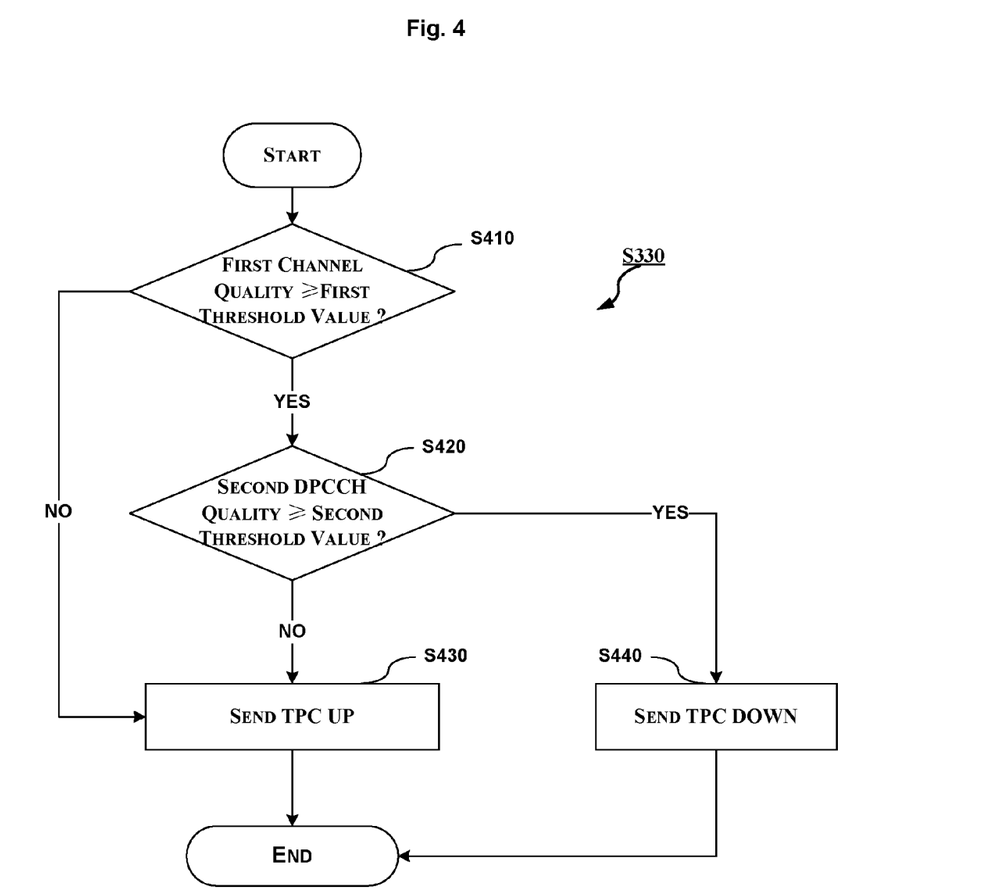
FIG. 4 illustrates detailed steps used for achieving step S330.

Specifically, as shown in FIG. 4, it is judged whether the first channel quality is not smaller than a first threshold value (step S410). If no, the procedure may proceed to step S430 where the base station 210 sends a TPC 'UP' command to the UE 220. The TPC 'UP' command may instruct the UE 220 to increase its transmit power. If yes, the method may proceed to step S420 where it is further judged whether the second channel quality is not smaller than a second threshold value. If the judgment result of the step S420 is no, the method may proceed to step S430. If the judgment result of the step S420 is yes, the method may proceed to step S440 where the base station 210 sends to the UE 220 a TPC 'DOWN' command, which may instruct the UE 220 to decrease its transmit power.

Although step S410 is indicated as a sub-step of step S330, it should be appreciated that such a step may occur at any time instant after step S310 and before step S420, no matter before or after step S320.

Alternatively, the second threshold value may refer to a target for the first control channel quality such as a DPCCH quality target, may be notified from the RNC 230. In this case, the second threshold value may be adjusted by the RNC 230 when the first channel quality is larger than the first threshold value plus a predetermined offset value. For example, the second threshold value may be kept unchanged when the first channel quality is smaller than the first threshold value minus the predetermined offset value.

Furthermore, the method 300 may further include a step (not shown) where the base station 210 notifies the RNC 230 of the first channel quality or an indicator of whether the first channel quality is below the first threshold value or not. The RNC 230 may use such information to decide whether to suspend or continue the outer loop power control. The indicator may be sent by the base station 210 to the RNC 230 by using the NBAP signaling over Iub interface. The RNC 230 may configure the base station 210 to send this indicator when radio link is established for the UE 220. The rule can also be pre-defined, i.e., when radio link is established for the UE 220 and the base station 210 performs the inner loop power control.

Figure 5:
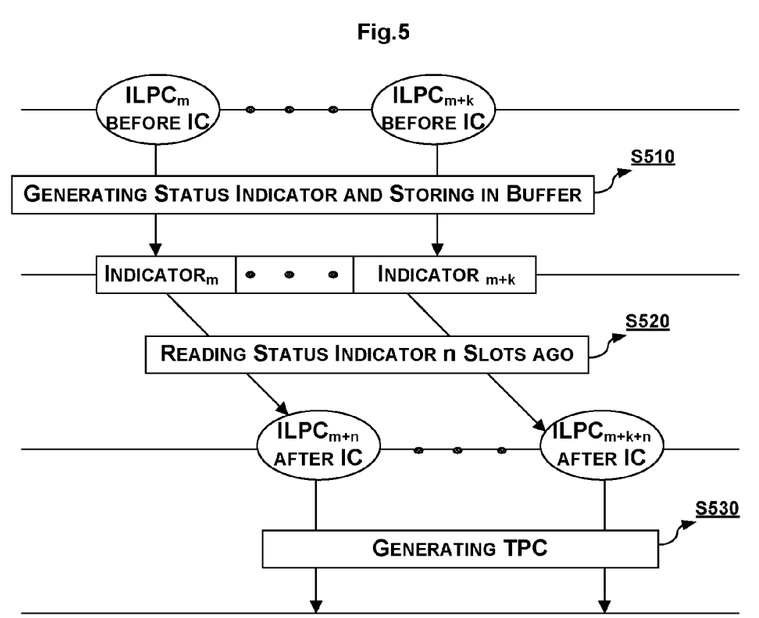
FIG. 5 shows a sequence diagram for operations occurring in the inner loop power control.

Suppose a transmit power control scenario with IC, where there is a TPC generation delay of n slots compared to that case without IC. FIG. 5 shows a sequence diagram for operations occurring in such a transmit power control, where a DPCCH quality bound before IC is considered. It is evident that the operations are depicted in terms of slots in FIG. 5.

As shown in FIG. 5, at a slot, such as slot m or slot m+k, the base station 210 may generate a status indicator, for example Indicator$_m$ corresponding to slot m or Indicator$_{m+k}$ corresponding to slot m+k, for indicating whether or not the first channel quality is not smaller than a first threshold value, and then stores the status indicator in its buffer (step S510).

For example, the status indicator may be set as "inactivated" to indicate the first channel quality is not smaller than the first threshold value, and as "activated" to indicate the first channel quality is smaller than the first threshold value.

Taking the first channel quality as the DPCCH quality before IC and the first threshold value as a DPCCH quality lower bound, this process may exemplified as follows:

---

IF DPCCH quality before IC ≥ the DPCCH quality lower bound
    Set the indicator to "inactivated"
    Update the buffer (which stores n indicators)
ELSEIF DPCCH quality before IC < the DPCCH quality lower bound
    Set the indicator to "activated"
    Update the buffer (which stores n indicators)
END

---

As a non-limiting example, the indicator may represent "DPCCH quality bound based PC".

After n slots, for example at slot m+n or slot m+n+k, the base station 210 may read the status indicator from the buffer (step S520), and then generate a TCP command based on the status indicator (step S530).

Specifically, when the status indicator indicates "inactivated", i.e., the first channel quality is not smaller than the first threshold value, the base station 210 may generate a TCP "DOWN" command if the second channel quality, such as the DPCCH quality after IC, is not smaller than the second threshold value such as the DPCCH quality target, and a TCP "UP" command if the second channel quality is smaller than the second threshold value. If the status indicator indicates "activated", i.e., the first channel quality is smaller than the first threshold value, the base station 210 may generate the TCP "UP" command.

In the context of the above exemplified example for step S510, steps S520 and S530 may be also exemplified as follows:

```
IF the indicator "DPCCH quality bound based PC" for n slots ago is
    "inactivated"
        IF DPCCH quality after IC ≥ the DPCCH quality target
            Send TPC "DOWN"
        ELSEIF DPCCH quality after IC < the DPCCH quality target
            Send TPC "UP"
        END
ELSEIF
    the indicator "DPCCH quality bound based PC" for n slots ago is
    "activated"
        Send TPC "UP"
END
```

According to this embodiment, the channel quality before IC such as the DPCCH quality before IC may be taken into account in the inner loop power control. As stated above, when the DPCCH quality before IC is higher than the quality lower bound (i.e. the lower bound of the DPCCH quality), the DPCCH quality after IC may be controlled towards the DPCCH quality target as usual. On the other hand, when the DPCCH quality before IC is lower than the DPCCH quality lower bound, the power control based on the DPCCH quality after IC may be overridden and the DPCCH quality before IC may be adjusted towards the quality lower bound. With such a solution, the present disclosure may avoid interference increase after IC due to power control while employing IC benefit more effectively.

Figure 6:
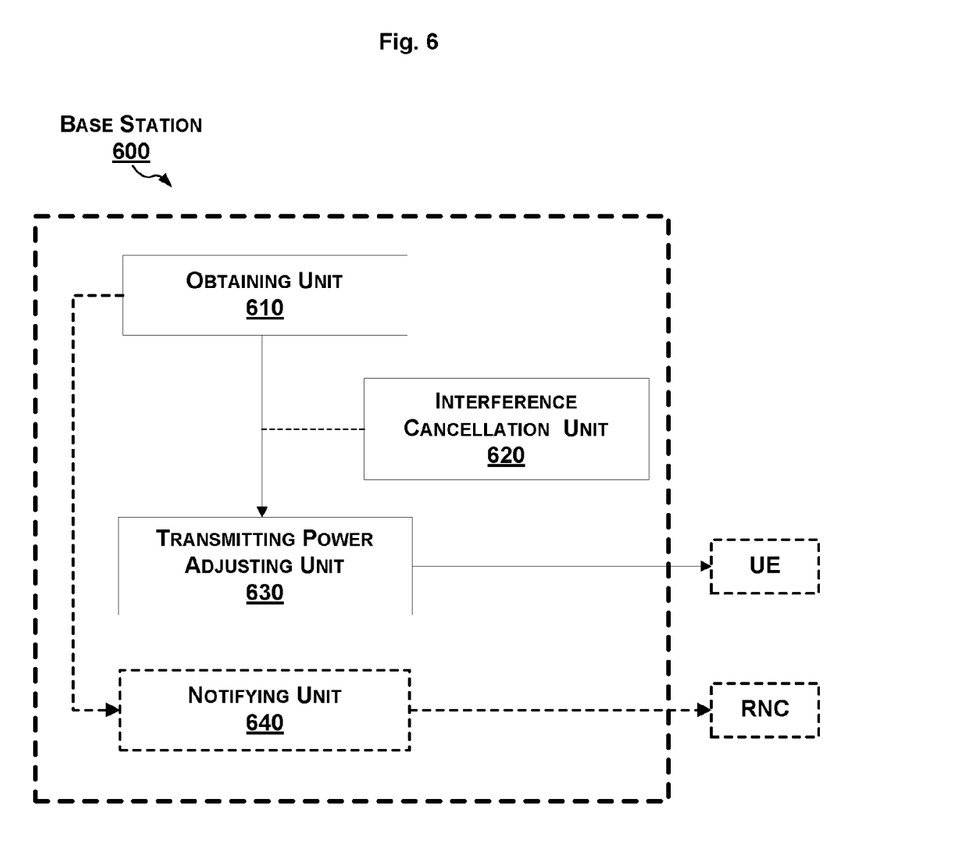
FIG. 6 shows a schematic diagram of a base station 600 according to an embodiment of the present disclosure.

Reference now is made to FIG. 6, which describes a structure of a base station 600 according to an embodiment of the present invention. The base station 600 according to the embodiment of the present invention may perform a transmit power control, such as an inner loop power control.

As shown in FIG. 6, the base station 600 may include: an obtaining unit 610 configured to obtain a first channel quality of a pilot channel for an user equipment (UE); an interference cancellation unit 620 configured to perform an interference cancellation on the pilot channel to obtain a second channel quality; and a transmit power adjusting unit 630 configured to instruct the UE to adjust the transmit power based on at least the first channel quality. The first threshold value may be configured by an RNC for example depending on efficiency of the interference cancellation.

Preferably, the pilot channel here may be a Dedicated Physical Control Channel (DPCCH) channel. In this case, each of the first channel quality and the second channel quality may refer to a DPCCH quality.

As a non-limiting example, the transmit power adjusting unit 630 may be further configured to send to the UE a first TPC command instructing the UE to increase its transmit power, if the first channel quality is not smaller than a first threshold value and the second channel quality is smaller than a second threshold value.

As another non-limiting example, the transmit power adjusting unit 630 may be further configured to send to the UE a second TPC command instructing the UE to decrease its transmit power, if the first channel quality is not smaller than the first threshold value and the second channel quality is not smaller than a second threshold value.

As still another non-limiting example, the transmit power adjusting unit 630 may be further configured to send a third TPC command instructing the UE to increase its transmit power, if the first channel quality is smaller than the first threshold value.

Preferably, the second threshold value may be notified from an RNC. In this case, the second threshold value may be adjusted by the RNC when the first channel quality is larger than the first threshold value plus a predetermined offset value. For example, the second threshold value may be kept unchanged when the first channel quality is smaller than the first threshold value minus the predetermined offset value.

Furthermore, the base station 600 may optionally further include a notifying unit 640 (denoted in dotted lines in FIG. 6) configured to notify the RNC of the first channel quality or an indicator of whether the first channel quality is below the first threshold value or not.

Figure 7:
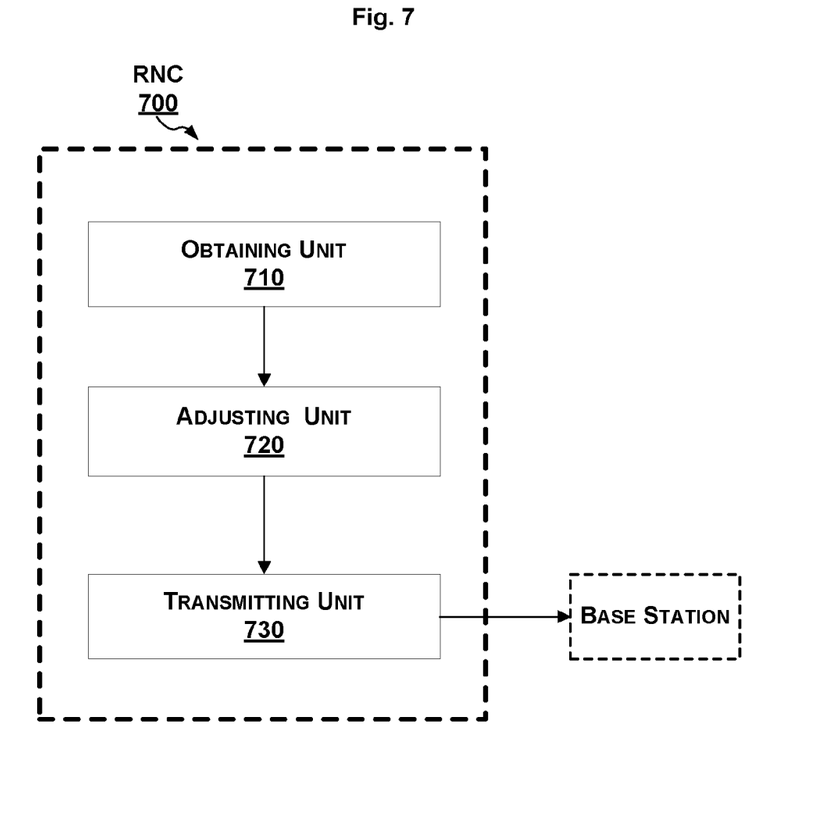
FIG. 7 shows a schematic diagram of a RNC 700 according to an embodiment of the present disclosure.

Reference now is made to FIG. 7, which describes a structure of a RNC 700 according to an embodiment of the present invention. The RNC 700 according to the embodiment of the present invention may perform a transmit power control, such as an outer loop power control.

As shown in FIG. 7, the RNC 700 may include an obtaining unit 710 configured to obtain a comparison result between a first channel quality of a pilot channel on which an interference cancellation is to be performed, and a first threshold value and a second threshold value; an adjusting unit 720 configured to adjust a channel quality target of the pilot channel based on the comparison result; and a transmitting unit 730 configured to transmit the adjusted channel quality target.

Preferably, the pilot channel may be a Dedicated Physical Control Channel (DPCCH) channel. In this case, the first channel quality may refer to a DPCCH quality, and the channel quality target may refer to a DPCCH quality target for adjusting the DPCCH quality.

As a non-limiting example, the adjusting unit 720 may be further configured to increase the channel quality target when the first channel quality is smaller than the first threshold value.

As another non-limiting example, the adjusting unit 720 may be further configured to adjust the channel quality target based on a conventional outer loop power control when the first channel quality is larger than the second threshold value.

As yet another non-limiting example, the adjusting unit 720 may be further configured to keep the channel quality target unchanged when the first channel quality is between the first threshold value and the second threshold value.

In practice, the DPCCH quality target for control on DPCCH quality after IC may be adjusted by the outer loop power control based on data BLER. Preferably, in case the DPCCH quality before IC is below the quality lower bound, the normal outer loop power control should be overridden, i.e., the adjustment of the DPCCH quality target is frozen. Therefore, whether to freeze or continue the outer loop power control may be implemented by sending an indicator from a base station to the RNC 700 to inform whether the DPCCH quality before IC is below the quality lower bound or not, or directly forwarding for example the indicator "DPCCH quality based PC" to the RNC 700.

As an example, the following actions may be performed in RNC 700:

```
IF the (filtered) DPCCH quality before IC < the quality lower bound −
    margin₁
        Set or recommend the outer loop power control status to
        "frozen" and suspend the DPCCH quality target adjustment
ELSEIF the (filtered) DPCCH quality before IC > the quality lower bound
    + margin₂
        Set or recommend the outer loop power control status to
        "active" and carrier out the DPCCH quality target adjustment
        as normal
END
```

Here, Margin$_1$ and margin$_2$ may be pre-defined implementation specific or configurable parameters.

Alternatively, the above normal outer loop power control procedure may be also carried out in the RNC in case no indicator is received from the base station that does not have IC capability, because such a procedure only relates to the DPCCH quality without IC.

In adjusting the DPCCH quality target with the outer loop power control, the DPCCH quality before IC may be also considered. More specifically, the RNC 700 may achieve at least one of the followings:

increasing the DPCCH quality target if the average (filtered) DPCCH SIR before IC is lower than a predefined lower bound 2;

Freezing the outer loop power control if the average (filtered) DPCCH SIR before IC is between a predefined lower bound 1 and the predefined lower bound 2; and Recovering the normal outer loop power control if the average (filtered) DPCCH SIR before IC is higher than a predefined lower bound 1.

Here, the predefined lower bounds 1 and 2 may be system configurable parameters, and the predefined lower bound 2 should be lower than the predefined lower bound 1.

It should be appreciated that the outer loop power control may also applicable in soft handover. Hereinafter, special handling related to the outer loop power control during soft handover will be described in more detail.

Specifically, for outer loop power control, multiple cells in an active set may indicate different statuses to the RNC, for example:

some cells may indicate that the DPCCH quality before IC is above the quality lower bound;

some cells may indicate that the DPCCH quality before IC is below the quality lower bound; and some cells even do not send any indicator regarding the above aspects.

These indicators need to be combined in a proper way at the RNC before determining a suitable action that the outer loop power control should adopt. This handling may be based on a suitable rule. Some examples for the rule are proposed as follows:

General Rule

As a general rule, in order to determine whether the RNC should adopt the outer loop power control procedure specific for handling DPCCH quality before IC or use the normal (legacy) outer loop power control procedure, the RNC should take into account the received indicators from all the cells involved in soft handover.

AND Rule

| | |
|---|---|
| If | the (filtered) DPCCH quality before IC for all the cells in the active set meets the criteria to trigger the outer loop power control procedure specific for handling DPCCH quality before IC |
| | Adopt the outer loop power control procedure specific for handling DPCCH quality before IC |
| Else | |
| | Adopt the normal outer loop power control procedure |
| End | |

OR Rule

| | |
|---|---|
| If | the (filtered) DPCCH quality before IC for any of the cells in the active set meets the criteria to trigger the outer loop power control procedure specific for handling DPCCH quality before IC |
| | Adopt the outer loop power control procedure specific for handling DPCCH quality before IC |
| Else | |
| | Adopt the normal outer loop power control procedure |
| End | |

Serving Cell Rule

According to this rule, the RNC may determine what outer loop power control procedure to adopt based on the received indicator from the serving cell e.g. serving E-DCH cell.

It should be appreciated that it is the network that may predefine or indicate which rule to be adopted.

According to foregoing embodiments of the present disclosure, the present disclosure may achieve at least one of the following advantages:

Avoiding interference increase after IC due to power control;

More efficient exploration of IC benefit;

Improved throughput;

Easy to implement; and

Providing more flexibility.

Other arrangements of the present disclosure include software programs performing the steps and operations of the method embodiments, which are firstly generally described and then explained in detail. More specifically, a computer program product is such an embodiment, which includes a computer-readable medium with a computer program logic encoded thereon. The computer program logic provides corresponding operations to provide the above described transmit power control scheme when it is executed on a computing device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g., CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g., a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

CPICH Common Pilot CHannel
DB-DC-HSDPA Dual band dual cell HSDPA

DC-HSUPA Dual cell high speed uplink packet access
DL Downlink
DPCCH Dedicated physical control channel
HSPA High-Speed Packet Access
IC Interference cancellation
L2 Layer 2
MAC Medium Access Control
OSS Operational Support Systems
RAT Radio Access Technology
RNC Radio Network Controller
RoT Rise over Thermal
RRC Radio Resource Control
RSCP Received Signal Code Power
SON Self Organizing Network
UE User Equipment
UL Uplink
WCDMA Wideband Code Division Multiple Access

What is claimed is:

1. A method for transmit power control (TPC) to adjust transmit power, the method comprising:
  obtaining a first channel quality of a pilot channel for an user equipment (UE) to compare to a first threshold value;
  performing an interference cancellation on the pilot channel to obtain a second channel quality of the pilot channel to compare to a second threshold value;
  instructing the UE to adjust the transmit power based on the first channel quality, when the first channel quality is smaller than the first threshold value; and
  instructing the UE to adjust the transmit power based on the second channel quality and the second threshold value, when the first channel quality is not smaller than the first threshold value.

2. The method according to claim 1, wherein the instructing the UE to adjust the transmit power based on the second channel quality comprises:
  when the first channel quality is not smaller than the first threshold value and the second channel quality is smaller than the second threshold value, sending to the UE a first TPC command instructing the UE to increase its transmit power.

3. The method according to claim 2, wherein the second threshold value is notified from a Radio Network Controller (RNC).

4. The method according to claim 3, wherein the second threshold value is adjusted by the RNC when the first channel quality is larger than the first threshold value plus a predetermined offset value.

5. The method according to claim 4, wherein the second threshold value is kept unchanged when the first channel quality is smaller than the first threshold value minus the predetermined offset value.

6. The method according to claim 5, further comprising notifying the RNC of the first channel quality or an indicator of whether the first channel quality is below the first threshold value or not.

7. The method according to claim 1, wherein the instructing the UE to adjust the transmit power based on the second channel quality comprises:
  when the first channel quality is not smaller than the first threshold value and the second channel quality is not smaller than the second threshold value, sending to the UE a second TPC command instructing the UE to decrease its transmit power.

8. The method according to claim 1, wherein the first threshold value depends on efficiency of the interference cancellation.

9. The method according to claim 1, wherein the first threshold value is configured by a Radio Network Controller (RNC).

10. The method according to claim 1, wherein the pilot channel is a Dedicated Physical Control Channel (DPCCH) channel.

11. A base station, comprising:
  an obtaining unit configured to obtain a first channel quality of a pilot channel for an user equipment (UE) to compare to a first threshold value;
  an interference cancellation unit configured to perform an interference cancellation on the pilot channel to obtain a second channel quality of the pilot channel to compare to a second threshold value; and
  a transmit power adjusting unit configured to instruct the UE to adjust transmit power based on the first channel quality, when the first channel quality is smaller than the first threshold value, and to instruct the UE to adjust the transmit power based on the second channel quality and the second threshold value, when the first channel quality is not smaller than the first threshold value.

12. The base station according to claim 11, wherein the transmit power adjusting unit is further configured to send to the UE a first transmit power control (TPC) command instructing the UE to increase its transmit power, when the first channel quality is not smaller than the first threshold value and the second channel quality is smaller than the second threshold value.

13. The base station according to claim 12, wherein the second threshold value is notified from a Radio network Controller (RNC).

14. The base station according to claim 13, wherein the second threshold value is adjusted by the RNC when the first channel quality is larger than the first threshold value plus a predetermined offset value.

15. The base station according to claim 14, wherein the second threshold value is kept unchanged when the first channel quality is smaller than the first threshold value minus the predetermined offset value.

16. The base station according to claim 15, further comprising a notifying unit configured to notify the RNC of the first channel quality or an indicator of whether the first channel quality is below the first threshold value or not.

17. The base station according to claim 11, wherein the transmit power adjusting unit is further configured to send to the UE a second transmit power control (TPC) command instructing the UE to decrease its transmit power, when the first channel quality is not smaller than the first threshold value and the second channel quality is not smaller than the second threshold value.

18. The base station according to claim 11, wherein the first threshold value depends on efficiency of the interference cancellation.

19. The base station according to claim 11, wherein the first threshold value is configured by a Radio Network Controller (RNC).

20. The base station according to claim 11, wherein the pilot channel is a Dedicated Physical Control Channel (DPCCH) channel.

21. A radio network controller (RNC), comprising:
  an obtaining unit configured to obtain a comparison result between a first channel quality of a pilot channel on which an interference cancellation is to be performed on the pilot channel to obtain a second channel quality, and a first threshold value and a second threshold value, wherein an user equipment (UE) is instructed to increase transmit power when the first channel quality is smaller than the first threshold value, instructed to increase the transmit power when the first channel quality is not smaller than the first threshold value and the second channel quality is smaller than the second threshold value, and instructed to decrease the transmit power when the first channel quality is not smaller than the first threshold value and the second channel quality is not smaller than the second threshold value;

an adjusting unit configured to adjust a channel quality target of the pilot channel based on the comparison result; and a transmitting unit configured to transmit the adjusted channel quality target.

22. The RNC according to claim 21, wherein, the adjusting unit is further configured to increase the channel quality target when the first channel quality is smaller than the first threshold value.

23. The RNC according to claim 21, wherein, the adjusting unit is further configured to adjust the channel quality target based on a conventional outer loop power control when the first channel quality is larger than the second threshold value.

24. The RNC according to claim 21, wherein the adjusting unit is further configured to keep the channel quality target unchanged when the first channel quality is between the first threshold value and the second threshold value.

25. The RNC according to claim 21, wherein the pilot channel is a Dedicated Physical Control Channel (DPCCH) channel.

26. A non-transitory computer readable storage medium having computer-executable instructions stored thereon which, when executed by a computer, adapt the computer to perform operations comprising:

obtaining a first channel quality of a pilot channel for an user equipment (UE) to compare to a first threshold value;

performing an interference cancellation on the pilot channel to obtain a second channel quality of the pilot channel to compare to a second threshold value;

instructing the UE to adjust transmit power based on the first channel quality,
when the first channel quality is smaller than the first threshold value; and instructing the UE to adjust the transmit power based on the second channel quality and the second threshold value, when the first channel quality is not smaller than the first threshold value.

27. The non-transitory computer readable storage according to claim 26, wherein the instructing the UE to adjust the transmit power based on the second channel quality comprises:

when the first channel quality is not smaller than the first threshold value and the second channel quality is smaller than the second threshold value, sending to the UE a first transmit power control (TPC) command instructing the UE to increase its transmit power.

28. The non-transitory computer readable storage according to claim 26, wherein the instructing the UE to adjust the transmit power based on the second channel quality comprises:

when the first channel quality is not smaller than the first threshold value and the second channel quality is not smaller than the second threshold value, sending to the UE a second transmit power control (TPC) command instructing the UE to decrease its transmit power.

29. The non-transitory computer readable storage according to claim 28, wherein the second threshold value is notified from a Radio Network Controller (RNC).

30. The non-transitory computer readable storage according to claim 29, wherein the second threshold value is adjusted by the RNC when the first channel quality is larger than the first threshold value plus a predetermined offset value.

31. The non-transitory computer readable storage according to claim 30, wherein the second threshold value is kept unchanged when the first channel quality is smaller than the first threshold value minus the predetermined offset value.

32. The non-transitory computer readable storage according to claim 31, further comprising notifying the RNC of the first channel quality or an indicator of whether the first channel quality is below the first threshold value or not.

33. The non-transitory computer readable storage according to claim 26, wherein the first threshold value depends on efficiency of the interference cancellation.

34. The non-transitory computer readable storage according to claim 26, wherein the first threshold value is configured by a Radio Network Controller (RNC).

35. The non-transitory computer readable storage according to claim 26, wherein the pilot channel is a Dedicated Physical Control Channel (DPCCH) channel.

\* \* \* \* \*